United States Patent [19]

Holz et al.

[11] Patent Number: 4,714,958
[45] Date of Patent: Dec. 22, 1987

[54] VIDEO PROCESSOR

[75] Inventors: Gary L. Holz, San Diego; Walter M. Foster, El Cajon, both of Calif.

[73] Assignee: BMP, Las Vegas, Nev.

[21] Appl. No.: 550,880

[22] Filed: Nov. 14, 1983

[51] Int. Cl.$^4$ .............................................. H04N 5/14
[52] U.S. Cl. .................................................... 358/166
[58] Field of Search ................. 358/166, 160, 167, 37, 358/38, 39

[56] References Cited

U.S. PATENT DOCUMENTS

| | | | |
|---|---|---|---|
| 3,859,544 | 1/1975 | Nero | 307/293 |
| 3,935,384 | 1/1976 | Jirka | 358/166 |
| 3,938,181 | 2/1976 | Avins | 358/38 |
| 4,030,121 | 6/1977 | Faroudja | 358/166 |
| 4,074,308 | 2/1978 | Gibson | 358/166 |
| 4,268,864 | 5/1981 | Green | 358/166 |
| 4,402,006 | 8/1983 | Karlock | 358/166 |
| 4,575,758 | 3/1986 | Egerod | 358/166 |

Primary Examiner—Tommy P. Chin
Attorney, Agent, or Firm—Spensley Horn Jubas & Lubitz

[57] ABSTRACT

A video processor receives a video signal and shifts and accentuates the signal in order to increase the apparent depth and resolution of the signal. The circuit operates to accentuate the interface between low luminance and high luminance portions of a video signal as a function of the slope of the video signal. The accentuated signal is also shifted by a slight amount and is then recombined with the original unmodified video signal. The result is substantially improved picture quality with the use of a minimal number of components.

11 Claims, 5 Drawing Figures

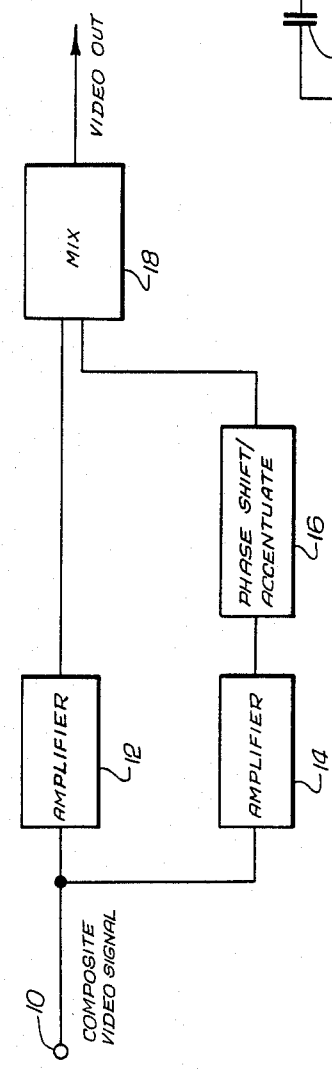
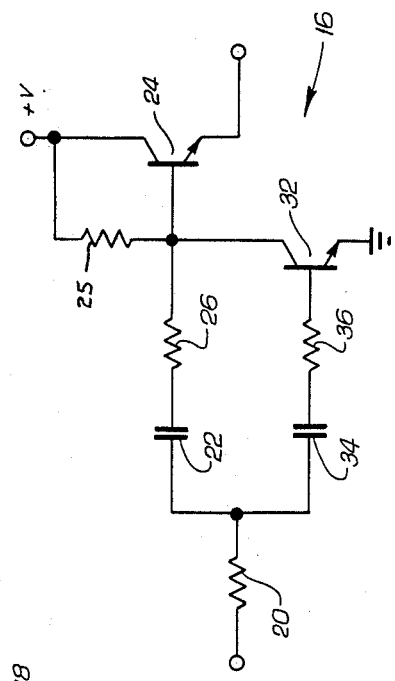
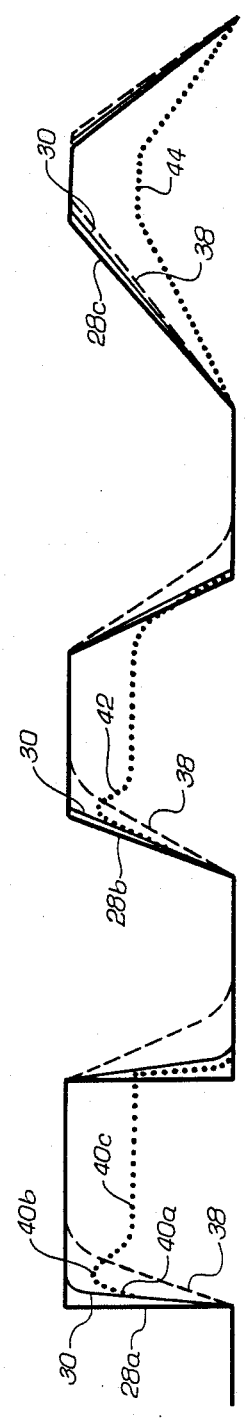

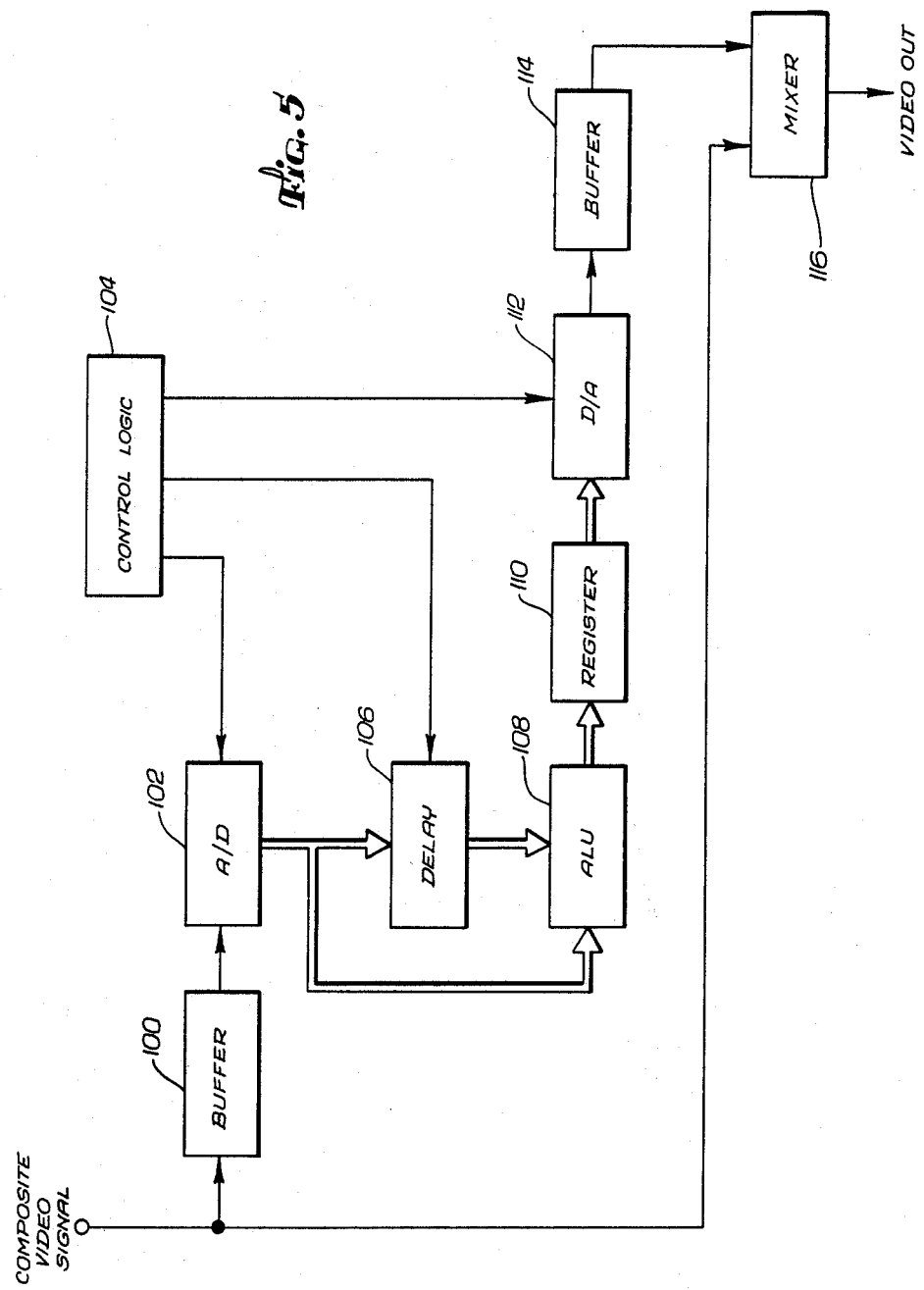

VIDEO PROCESSOR

BACKGROUND OF THE INVENTION

1. Field of the Invention

The present invention relates to circuits for processing video signals and more particularly to circuits for improving the television picture quality of a standard broadcast television signals such as NTSC signals.

2. Description of the Prior Art

Efforts are constantly being made to improve television picture quality. Many different picture "enhancers" have been developed, with varying degrees of success. Most enhancers have various problems associated with them, primarily in terms of distortion of the picture.

Television systems having increased resolution are commonly referred to as high definition television (HDTV). Such systems generally fall into three categories. The first category includes NTSC-type systems with evolutionary improvements which give the appearance of higher resolution. For example, various interference effects can be greatly reduced by the use of advanced "comb" filters and by using a digital framestore to eliminate the standard "interlaced" scanning method. A second category retains the 525-line and 4:3 aspect ratio of NSTC TV but employs non-NSTC encoding and requires a wider bandwidth. A third category is completely incompatible with NTSC-type systems and typically includes at least double the number of scan lines as are used in NTSC systems. The major problems associated with the second and third categories of HDTV are partial or complete incompatibility with the standard NTSC system, with resultant high costs associated with changing over to a new system. Therefore, it is desirable to provide some means of increasing picture resolution while maintaining the use of the standard NTSC format.

Circuits for improving television picture quality are disclosed in U.S. Pat. No. 3,859,544 to Nero, U.S. Pat. No. 3,935,384 to Jirka, U.S. Pat. No. 3,938,181 to Avins, U.S. Pat. No. 4,030,121 to Faroudja, U.S. Pat. No. 4,074,308 to Gibson, U.S. Pat. No. 4,268,864 to Green, and U.S. Pat. No. 4,402,006 to Karlock. In the Nero patent, a delay circuit is disclosed for delaying luminance information with respect to chroma information. In addition, a "crispness" circuit is discussed in which preshoot and overshoot in the luminance circuit is provided. In Kurka, a circuit for modulating scan velocity is disclosed to improve picture quality. Avins discloses a circuit in which the bandwidth of the luminance signal is controlled as a function of the amplitude of chrominance information. Faroudja discloses a video crispener in which video signals are differentiated twice and added to the original signal in order to give the appearance of increased bandwidth. In Gibson, a delay line is employed in which a plurality of delayed signals are combined in a controlled fashion in order to accentuate high frequency portions of a video luminance signal. Green discloses an enhancement system in which a fraction of a composite detail signal representative of amplitude variations of the video signal is subjected to processing and added to the delayed video signal to provide a picture with reduced noise while maintaining detail. Karlock discloses an enhancer in which picture detail is enhanced by suppressing large transitions in a video signal and adding the suppressed signal to a main video signal.

SUMMARY OF THE INVENTION

The present invention is directed to a system for substantially improving the picture quality of a standard NTSC system. Broadly, the invention is directed to a system for shifting a video signal, accentuating the luminance and hue of the shifted video signal at the interface between low luminance and high luminance portions of the signal and combining the shifted and accentuated signal with the original video signal. In a preferred embodiment of the invention, a video signal is divided into first and second video signals. The second video signal is shifted in phase with respect to the first video signal by a relatively small amount and is amplified and recombined with the first video signal. The amplification of the shifted second video signal is controlled as a function of the slope of the signal so that the luminance and hue of the shifted signal will be accentuated at steep transitions from low luminance to high luminance. The result of the shifting and selective amplification of the second video signal and remixing with the original signal is a television picture having substantially improved clarity and a distinct impression of depth in the picture.

BRIEF DESCRIPTION OF THE DRAWINGS

The invention will now be described with reference to the accompanying drawings, wherein:

FIG. 1 is a block diagram of an analog version of the present invention;

FIG. 2 is a schematic diagram of the phase shift/accentuate circuitry of FIG. 1;

FIG. 3 is a timing diagram showing video signals produced by the present invention.

FIG. 5 is a block diagram of a digital embodiment of the present invention.

DESCRIPTION OF THE PREFERRED EMBODIMENT

Figure 4:
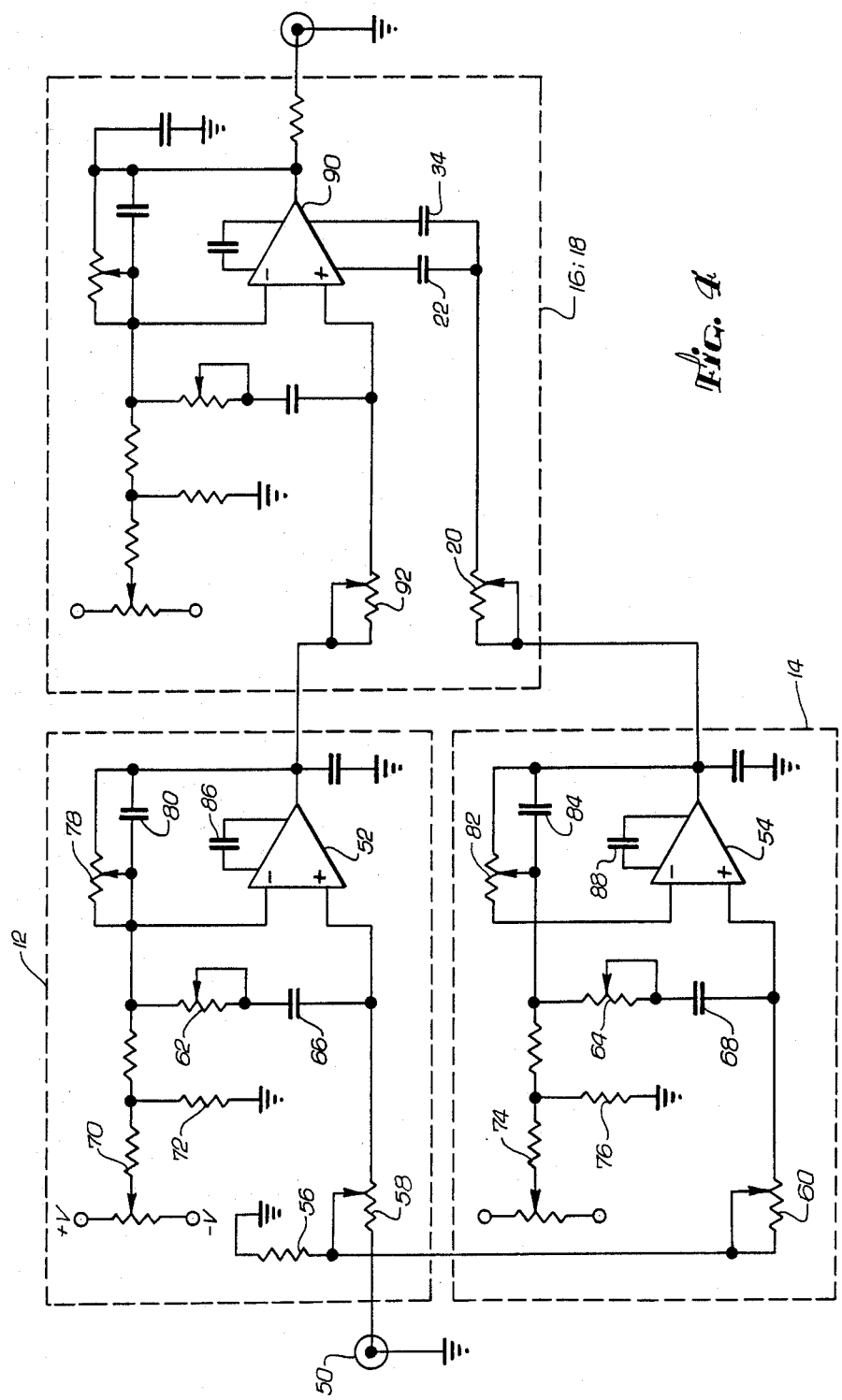
FIG. 4 is a schematic diagram of the system of FIG. 1.

The following description is of the best presently contemplated mode of carrying out the invention. This description is not to be taken in a limiting sense, but is made merely for the purpose of illustrating the general principles of the invention. The scope of the invention is best determined by reference to the appended claims.

Referring to FIG. 1, the present invention operates to modify a composite video signal delivered at an input 10. The modification circuitry may be located at any point in the recording/transmission/reproduction chain. The video signal is supplied to a first amplifier 12 and a second amplifier 14. The output of the amplifier 14 is provided to phase shift/accentuate circuitry 16 which causes the video signal to be selectively shifted and accentuated as a function of its rise time. The modified video signal is recombined with the unmodified output of the amplifier 12 by means of a mixer 18 to provide the final video signal for reproduction.

The fundamental operation of the invention will be described with reference to FIGS. 2 and 3. FIG. 2 illustrates the general configuration of the phase shift/accentuate circuitry 16 of FIG. 1. The purpose of this circuitry is to modify the composite video signal from the amplifier 14 so that the interface from low to high luminance levels will be accentuated as a function of the rise time of the video signal. In addition, the circuit operates to shift the phase of the video signal as a function of its rise time. The video signal from the amplifier 14 is applied to a first RC network which includes a resistor 20 and capacitor 22. The capacitively coupled signal is applied to a first transistor 24 through a resistor 26. A bias is applied to the base of the transistor 24 via a resistor 25. The output at the emitter of the transistor 24 is the output signal for the circuit 16. In operation, the capacitively coupled video signal will drive the transistor 24, with the result being an output which is shifted with respect to the original video signal. The degree of shift is dependent upon the time constant of the RC network. Typically, the RC network will have a very short time constant and the phase shift of the video signal will be quite small. This is illustrated in FIG. 3. The video input signal at the input 10 is illustrated by a waveform 28. Because of the capacitive coupling, the input to the base of the transistor 24 will be shifted with respect to the signal 28, as indicated at 30 in FIG. 3. The degree of shift will be dependent upon the rise time of the video signal 28, with signals having a steep slope as indicated at 28a resulting in a greater shift than signals having a lesser slope as indicated at 28b and 28c. For the portions 28b and 28c, (i.e., low frequency signals) the output of the RC network will closely follow the input signal.

Thus, the video signal will be shifted in proportion to its rise time. In addition, the circuit of FIG. 2 operates to control the gain of the transistor 24, also as a function of the rise time of the video signal. The gain of the transistor 24 is controlled by a second transistor 32. By turning on the transistor 32, a portion of the input signal 30 will be shunted away from the base of the transistor 24, thus reducing the drive to the transistor 24. This gain control is achieved as a function of the rise time of the video signal. The video signal from the amplifier 14 is applied to a second RC network consisting of the resistor 20 and a capacitor 34, and the capacitively coupled signal is applied to the base of the transistor 32 via a resistor 36. As the video signal increases, the drive to the transistor 32 will increase, thus reducing the drive to the transistor 24. The gain of the circuit is thus controlled as a function of the magnitude of the video signal.

The accentuating operation of the circuit 16 is achieved by the operation of the second RC network to control the drive to the transistor 32. The value of the capacitor 34 is greater than that of the capacitor 22, with the result being that the time constant of the second RC network is greater than that of the first RC network. The second RC network will thus shift the video input signal to a greater extent than will the first RC network. This is indicated at 38 in FIG. 3. When the video signal has a steep slope, as at 28a, the signal 38 will lag behind the video signal by a greater extent than the signal 30. This signal 38 is applied to the base of the transistor 32. Since its rise time is relatively slow, the drive to the transistor 32 will initially be quite small. As a result, almost the entire signal 30 will be applied to the base of the transistor 24, with the result being that the output of the transistor 24 will closely track the signal 30. As the magnitude of the signal 38 increases, the transistor 32 will turn on and shunt away an increasing portion of the signal 30 from the base of the transistor 24. The output of the transistor 24 will thus cease to track the signal 30, as indicated at 40a in FIG. 3. The output of the transistor 24 will reach a peak at point 40b, where the signal 30 is at its maximum and the drive to the transistor 32 is at a middle level. As the signal 38 increases, the transistor 32 will progressively shunt away more of the drive to the transistor 24, thus causing its output to reduce as indicated at 40c. For the signal 28b, the lag between the signals 30 and 38 will result in a similar output signal 42. For the signal 28c which does not have a steep slope, the signal 38 will closely track the signal 30, with the result being that the input to the transistor 24 will be progressively and evenly shunted away by the transistor 32. The resulting output of the transistor 24, indicated at 44, will not be accentuated as with the steeper signals.

Thus, the circuit shown in FIG. 2 provides a video output signal (40, 42, 44) in which the interface from low to high luminance portions will be accentuated depending on the slope of the video signal. In addition, the video signal will be phase shifted with respect to the original signal. It should be noted that the accentuation of the interface between high and low luminance portions of the signal will be much more pronounced at transitions from low to high luminance rather than from high to low luminance. When the signal is changing from high luminance to low luminance, the gain of the system begins at a minimum and the reduction in the output of the transistor 24 is achieved as a result of the reduction in the magnitude of the video signal rather than in the gain of the transistor.

The shifted and accentuated signal provided by the circuit of FIG. 2 is mixed with the unmodified video signal at the mixer 18 in order to provide the final video output. The effect is the reproduction of the unmodified video signal in combination with the shifted and accentuated signal. The resulting image seen on a television screen appears to have depth and much higher resolution than an unmodified picture. It is to be noted that the circuit provides improvements both in contrast and hue since it operates on the composite video signal.

A preferred embodiment for the analog circuit of the present invention is shown in FIG. 4. In this figure, various elements which correspond to FIGS. 1 and 2 are similarly labeled. Video signals enter the circuit at a BNC connector 50. The video signal is fed to the amplifier 12 which includes an integrated circuit amplifier 52 and the amplifier 14 which includes an integrated circuit amplifier 54. A terminating resistor 56 helps to match the input impedance of the circuit to a standard 75 ohm transmission line. Potentiometers 58 and 60 control the input impedance to the IC's 52 and 54, respectively, as well as controlling the magnitude of the signal to the IC's. Potentiometers 62 and 64 control the level and phase of feedback signals to the positive input of the IC's 52 and 54, while capacitors 66 and 68 provide AC coupling for the feedback signals. The potentiometer and capacitor network provides control of the high frequency component of the video signal (burst) and stabilizes the IC's when changes in input impedance and gain are made.

Resistors 70, 72, and 74, 76 control the DC offset null of the IC's. In addition, this network helps control the tint of the picture by causing chroma phase changes. A feedback loop made up of potentiometer 78 and capacitor 80 and potentiometer 82 and capacitor 84 provides a means of controlling the gain of the IC's. The capacitors 80 and 84 are present to inhibit excessive ringing. Capacitors 86 and 88 provide compensation to the first stage of the IC's to allow high frequency operation without oscillation.

The output of the IC 52 is coupled to the noninverting input of an IC 90 via a potentiometer 92. Various circuit elements associated with the IC 90 perform the same function as similar elements associated with the IC's 52 and 54. The IC 90 provides the mixing and accentuating function for the circuit. The output of the IC 54 is provided to the second stage compensation inputs of the IC 90 via the potentiometer 20 and the capacitors 22 and 34. The potentiometer 20 and capacitors 22 and 34 form the RC networks which provide the necessary delay in the video signal from the amplifier 14. The desired accentuation of the video signal from the amplifier 14 is accomplished within the IC 90, as is the mixing with the unmodified video signal. In the present embodiment of the invention, the IC 90 is a Fairchild model uA715 high speed amplifier and the capacitors 22 and 34 are coupled to the second stage compensation inputs (pins 7 and 10 of a ten pin package). In the present embodiment of the invention, the capacitors 22 and 34 have values of 220 pf and 33 nf, respectively. The circuitry shown in FIG. 2 is a part of the IC 90. The output of the IC 90 is the mixed output of the unmodified and modified video signals and is provided to drive a television receiver.

The present invention may also be implemented in a digital format. Such a system is illustrated in FIG. 5. In this system, the composite video signal is applied to a buffer 100 and is converted to a digital value by an analog-to-digital converter 102. The analog video signals are sampled once every 62.5 nanoseconds, or at four times the video rate. The analog-to-digital converter used in the present embodiment is a high speed device having 8 bits of resolution. The sampling of the video signal is done under the control of a control logic section 104 which includes a reference clock and read only memory circuits to provide the desired timing control signals.

The output of the analog-to-digital converter is applied to a digital delay circuit 106, the output of which is provided to an arithmetic logic unit 108. The delay circuit is operated under control of the logic 104. The output of the analog-to-digital converter is also applied directly to the arithmetic logic unit 108. The arithmetic logic unit sums the eight-bit signals and provides a ten-bit binary output. This is accomplished by using the carry and propagate outputs of the arithmetic logic unit in order to provide a logarithmic sum which corresponds to the amplification accomplished in the analog embodiment of the invention.

The output of the arithmetic logic unit 108 is applied to a register 110, the contents of which are converted to an analog value by a digital-to-analog converter 112. The output of the converter 112 is supplied to a buffer 114 and is mixed with the original, unmodified video signal by a mixer 116.

The digital embodiment of the invention operates identically to the analog embodiment described above, but is more complex and expensive to implement. Therefore, the analog embodiment is presently preferred.

What is claimed is:

1. A video processor for improving picture quality comprising:
   input means for receiving a composite video signal having a varying magnitude level and dividing the video signal into first and second video signals;
   modification means for receiving the second video signal and selectively accentuating the magnitude of the second video signal between relatively low magnitude portions and relatively high magnitude portions, wherein the modification means includes phase shift means for selectively phase shifting portions of the second video signal with respect to the first video signal to provide a modified second video signal; and
   mixing means for combining the modified second video signal with the first video signal to provide an accentuated video output signal.

2. A video processor according to claim 1 wherein the phase shift means includes a first RC network for shifting the phase of the second video signal.

3. A video processor according to claim 2 wherein the modification means accentuates shifted portions of the second video signal.

4. A video processor according to claim 3 wherein the modification means includes amplification means for amplifying the video signal resulting from the phase shifting and control menas reponsive to the second video signal for controlling the gain of the amplification means to provide said modified second video signal.

5. A video processor, comprising:
   input means for receiving a composition video signal and dividing it into first and second video signals;
   amplification means for amplifying the second video signal;
   first capacitive coupling means for capacitively coupling the second video signal from the input means to the amplification means;
   gain control means for controlling the gain of the amplification means in response to the second video signal to cause portions of the second video signal between relatively low luminance portions and relatively high luminance portions to be accentuated; and
   mixing means for combining the output of the amplification means with the first video signal to provide an accentuated video output signal.

6. A video processor acccording to claim 5 wherein the gain contorl means includes:
   variable shunt means for diverting the coupled second video signal away from the amplification means; and
   second capacitive coupling means for capacitively coupling the second video signal to the shunt means to control the operation thereof so that the gain of the amplification means varies in response to changes in the magnitude of the capacitively coupled second video signal.

7. A video processor according to claim 6 wherein the first and second capacitive coupling means have first and second time constants, respectively, wherein the first time constant is shorter than the second time constant thereby causing the rise time of the second video signal through the first capacitive coupling means to be less than the rise time of the second video signal through the second capacitive coupling means, whereby the gain of the amplification means will be relatively high during sharp transitions from low luminance to high luminance portions of the second video signal, thereby accentuating said transitions.

8. A video processor comprising:
   input means for receiving a composite video signal having time varying amplitude and dividing it into first and second video signals each having an instantaneous slope at any point in time;

modification means for (a) phase shifting the second video signal with respect to the first video signal to provide a phase shifted signal and (b) accentuating portions of said phase shifted signal as a function of the slope of the second video signal to provide a modified signal; and mixing means for mixing the modified signal with the first video signal to provide an accentuated output signal.

9. A video processor according to claim 8 wherein the modification means includes analog-to-digital converter means for digitizing the second video signal to provide a first digitized signal, delay means for delaying the digitized signal to form a delayed digitized signal and provide said phase shifting and combining means for combining the delay digitized signal with the first digitized signal to provide said accentuating, and digital-to-analog converter means for converting the output of the combining means to an analog signal.

10. A video processor according to claim 8 wherein the modification means includes first capacitive coupling means for shifting phase the second video signal and amplifying means for amplifying the shifted phase second video signal, said amplifying means including means for varying the gain of the amplifying means as a function of the slope of the second video signal to accentuate portions thereof having a steep positive slope.

11. A video processor according to claim 10 wherein the means for varying the gain of the amplifying means includes second capacitive coupling means for receiving the second video signal and shunt means, controlled by the second capacitive coupling means, for shunting a portion of the input to the amplifying means as a function of the magntiude of the second video signal from the second capacitive coupling means.

* * * * *